Figure 1:
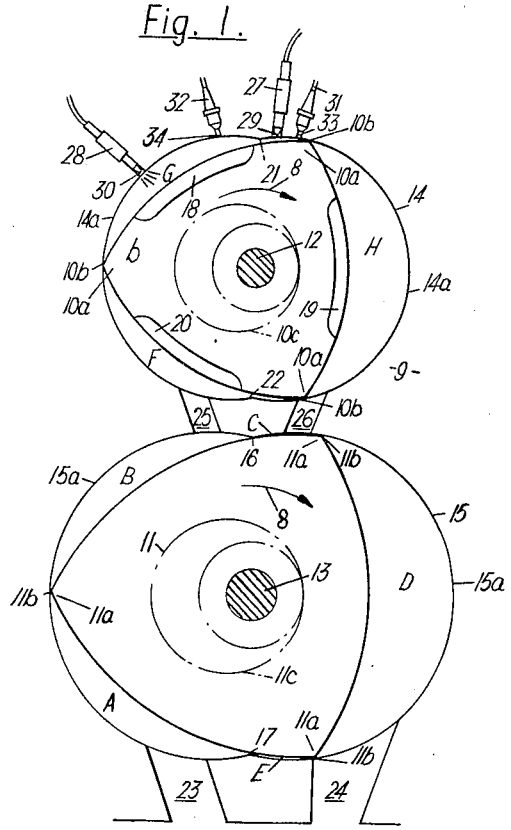
Figure 2:
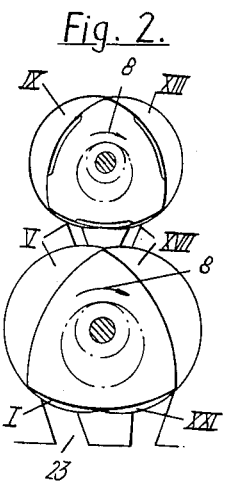
Figure 3:
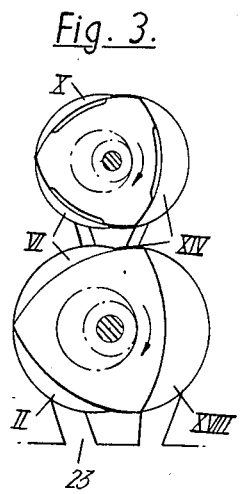

Jan. 11, 1966  F. FELLER  3,228,183
ROTARY INTERNAL COMBUSTION ENGINE
Filed Jan. 20, 1964  5 Sheets-Sheet 1

Jan. 11, 1966     F. FELLER     3,228,183
ROTARY INTERNAL COMBUSTION ENGINE
Filed Jan. 20, 1964     5 Sheets-Sheet 2

Jan. 11, 1966    F. FELLER    3,228,183
ROTARY INTERNAL COMBUSTION ENGINE
Filed Jan. 20, 1964    5 Sheets-Sheet 3
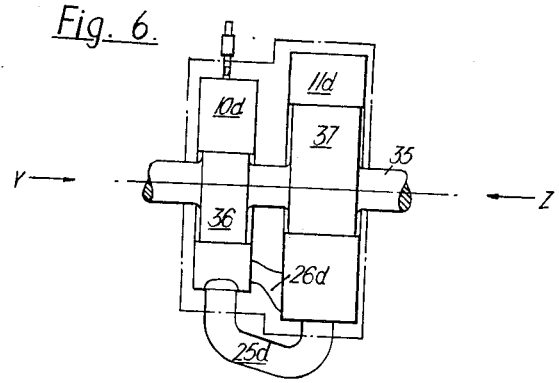
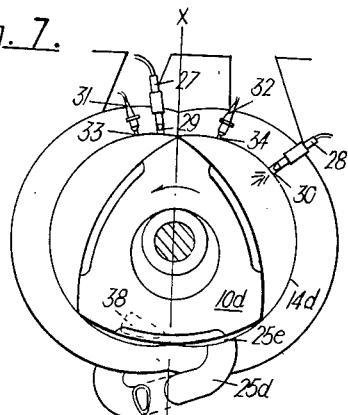
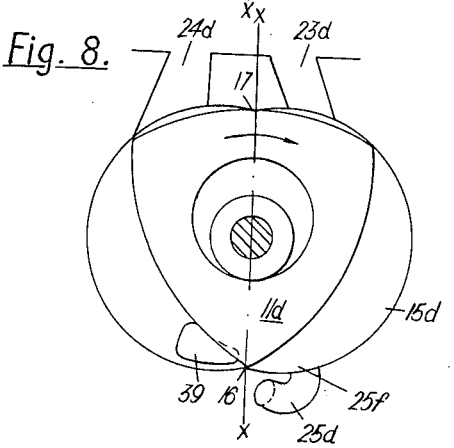

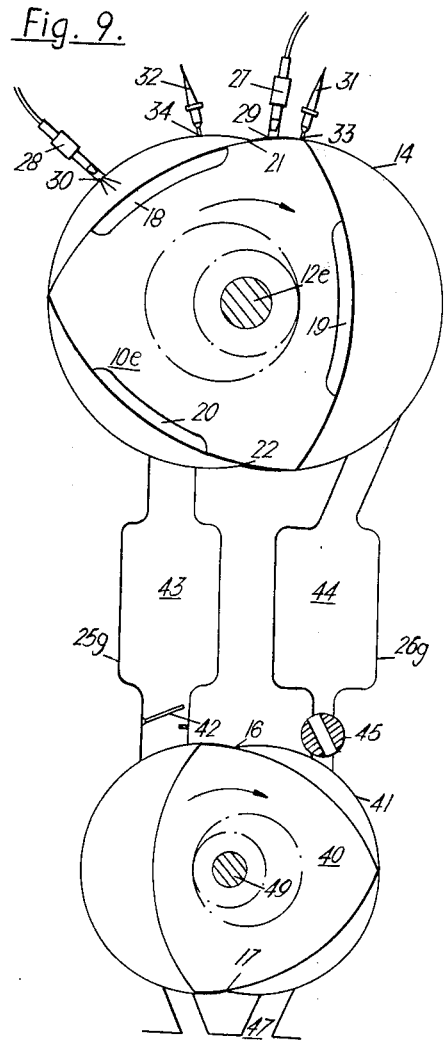

United States Patent Office 3,228,183
Patented Jan. 11, 1966

3,228,183
ROTARY INTERNAL COMBUSTION ENGINE
Fritz Feller, Wistaston, Crewe, England, assignor to Rolls-Royce Limited, Derby, England, a company of Great Britain
Filed Jan. 20, 1964, Ser. No. 338,965
Claims priority, application Great Britain, Nov. 27, 1963, 46,950/63
6 Claims. (Cl. 60—15)

This invention concerns a rotary internal combustion engine of the type (hereinafter referred to as "the type described") comprising an inner body which is mounted within an outer body, means for effecting relative rotation of said bodies, the said bodies being respectively provided with surfaces which define working chambers, and means for supplying fuel and air to the working chambers and for permitting the withdrawal of exhaust gases therefrom, the working chambers varying in volume and position during the said relative rotation so that a working cycle is effected in which the said air is compressed and the said exhaust gases are expanded.

The said working cycle may include the four phases of intake, compression, expansion and exhaust, fuel being added to this air during the compression phase, and the resulting mixture being ignited towards the end of the compression phase, either by the method of compression ignition or by a method employing external means such as electric sparks, or by a combination of both these methods.

According to the present invention, there is provided a rotary internal combustion engine of the type described in which there are additional means for pre-compressing the air before the latter is supplied to the said chambers and for effecting further expansion of the exhaust gases after the latter have left the said chambers.

The said additional means preferably comprise a second rotary internal combustion engine of the type described. In this case, the said second engine preferably has at least one more working chamber than the first mentioned engine.

The inner and outer bodies of the said second engine may be larger than those of the first-mentioned engine, the inner and outer bodies of the first-mentioned engine being relatively rotated at substantially the same rotational speed as those of the second engine.

The inner and outer bodies of the said second engine may be relatively rotated at a greater rotational speed than those of the first mentioned engine, air compressed in the said second engine passing to the first mentioned engine by way of a duct incorporating a non-return valve, and exhaust gases passing from the first-mentioned engine to the second engine by way of a duct incorporating a valve which is timed to open and close in synchronism with the rotational speed of the second engine. In this case, the inner and outer bodies of the said second engine are preferably smaller than those of the first-mentioned engine.

Alternatively, the said additional means may comprise a compressor and a turbine.

The said additional means may communicate with the first-mentioned engine by way of ducting, valve means being provided in said ducting which are settable to positions in which the additional means may be connected to or disconnected from the first-mentioned engine.

Thus, by appropriate setting of the said valve means, the engine may be run either as a high compression ratio engine or as a low compression ratio engine for use with lower grade fuel.

The additional means may be driven by the first mentioned engine. In this case, the first mentioned engine may have a rotary shaft which drives one of said bodies thereof and which also drives the said additional means.

The, or each said engine preferably has an outer body which is constituted by a rotor housing having an axis of symmetry, the inner body being constituted by a rotor which is rotatable about an axis which is at all times parallel to the said axis of symmetry.

Preferably, the rotor housing of the or each said engine is stationary, the rotor being rotatable about an axis which is constrained to follow a circular path of fixed radius about the said axis of symmetry.

The rotor housing of the or each said engine may however be rotatable about a fixed axis of symmetry, and, in this case, the rotor is also rotatable about a fixed axis.

The rotor preferably has a peripheral surface which includes a number of circumferentially spaced apex portions which are symmetrically arranged with respect to the axis of the rotor, the apex portions having sealing edges which are parallel to the said axis of symmetry and which are at all times in sliding sealing engagement with the inner surface of the rotor housing, the inner surface of the rotor housing including circumferentially spaced, arched, lobe-defining portions which are successively joined together, the lobe-defining portions being one fewer in number than the number of apex portions and providing at their junctions with each other points of minimum distance from the said axis of symmetry.

Preferably the profile of the inner surface of the rotor housing in planes normal to the said axis of symmetry is substantially that of a two-lobed epitrochoid, the profile of the peripheral surface of the rotor in the same planes being substantially that of the three-lobed inner envelope of the two-lobed epitrochoid.

The peripheral surface of the rotor may have circumferentially spaced recesses therein so that preferred combustion chamber shapes and volumes and preferred compression ratios can be achieved.

The engine may comprise a plurality of the said first-mentioned engines, at least one additional means being provided for supplying pre-compressed air to each said first-mentioned engine and for effecting further expansion of the exhaust gases therefrom.

Figure 10:
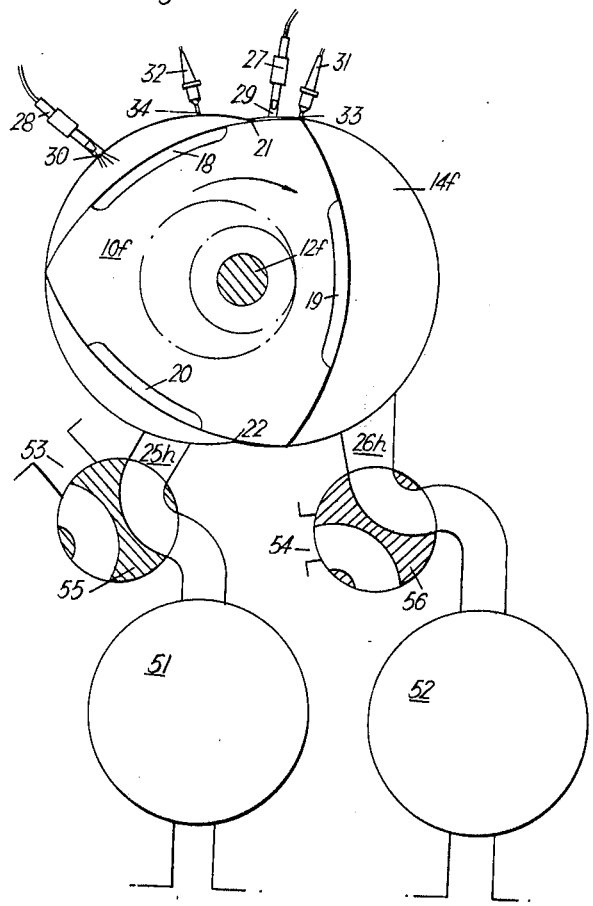

The invention is illustrated, merely by way of example, in the accompanying drawings, in which:

FIGURE 1 is a diagrammatic view of a rotary internal combustion engine according to the present invention, FIGURES 2–5 illustrate the operation of the engine of FIGURE 1, FIGURE 6 is a diagrammatic sectional view of another rotary internal combustion engine according to the present invention, FIGURE 6 being taken on the line X—X of FIGURES 7 and 8, FIGURES 7 and 8 are end views looking respectively in the direction of the arrow Y and arrow Z of FIGURE 6, and FIGURES 9 and 10 are sectional views of two further embodiments of rotary internal combustion engines according to the present invention.

Referring first to FIGURE 1, a rotary internal combustion engine has two rotors 10, 11, which are respectively mounted on separate shafts 12, 13. The shafts 12, 13 are constrained to run in the same angular sense and at the same speed by means which are not shown but which may be constituted by gears, by a number of connecting rods running on eccentrics, by chains, or by any other suitable means. The rotors 10, 11 are respectively rotatable in cavities 14, 15 formed in a stationary rotor housing 9, the rotors being adapted to be rotated in the direction of the arrows 8.

The rotors 10, 11 have peripheral surfaces which include three circumferentially spaced apex portions 10a, 11a respectively, which are symmetrically arranged with respect to the axes of the rotors 10, 11. The apex portions 10a, 11a have sealing edges 10b, 11b respectively which are respectively parallel to the axes of symmetry of the cavity 14, 15 and which are at all times in sliding sealing engagement with the surfaces of the cavities 14, 15 respectively. The surfaces of the cavities 14, 15 include two circumferentially spaced arched lobe defining portions 14a, 15a respectively which are successively joined together and which provide, at their junctions 21, 22 and 16, 17 points of minimum distance from the axes of symmetry of the cavities 14, 15. Thus the surfaces of the cavities 14, 15 in planes normal to their axes of symmetry are substantially those of a two-lobed epitrochoid. The surfaces of the rotors 10, 11 in the same planes being substantially those of the three-lobed inner envelope of the two-lobed epitrochoid.

The rotors 10, 11 are rotatable about axes which are at all times parallel to the axes of symmetry of the respective cavities 14, 15. The said axes are, moreover, constrained to follow circular paths 10c, 11c of fixed radius about the axes of symmetry of the rotors 10, 11.

The rotor 10, which is smaller than the rotor 11, has recesses or depressions 18, 19, 20, which are provided in the peripheral surface of the rotor 10 and are circumferentially spaced apart. The rotor 10, with its recesses 18, 19, 20, forms with its cavity 14 three working chambers F, G, H. The working chambers F, G, H may be sealed from each other in a known manner by sealing strips (not shown) at each of the three apex portions 10b of the rotor 10, the sides of the rotor 10 being provided with further sealing strips (not shown) which connect with the sealing strips at the apex portion 10b.

The rotor 11, which is larger than the rotor 10, has no recesses or depressions, so that it defines with its cavity 15 either three or four working chambers according to the position of the rotor 11. The chambers may be sealed from each other *in part* by sealing strips (not shown) in a similar manner to that in which working chambers F, G, H are sealed from each other. In part no sealing is provided, the boundary of the chamber being defined by the proximity of the rotor 11 to junctions 16 or 17 of the housing. Alternatively sealing strips (not shown) which are similar to the sealing strips on the apex portions 11b may be slidably mounted at the said junctions 16, 17. In that case the rotor 11 defines with its cavity 15 either four or five of the working chambers A, B, C, D, E according to the position of the rotor 11.

Air may enter the engine through an inlet port 23 and may leave the engine from an exhaust port 24. A transfer duct 25 permits air to flow from the cavity 15 to the cavity 14, while a transfer duct 26 permits exhaust gases to flow from the cavity 14 to the cavity 15.

Fuel injectors 27, 28, are arranged at positions 29, 30, in the wall of the cavity 14 opposite the side thereof where the transfer ducts 25, 26 are situated. The fuel injectors 27, 28 thus supply fuel to the working chamber G, this fuel being ignited by means of spark plugs 31, 32 which are disposed at positions 33, 34, respectively. The use of such external means of ignition as spark plugs 31, 32 may not, however, in all cases be necessary, and reliance may, for example, be placed merely on compression-ignition.

The various working chambers A–H vary in both volume and position during the rotation of the rotors 10, 11, so that a working cycle is effected in which the air entering the cavities 14, 15 is compressed and the exhaust gases therein are expanded.

The nature of the said working cycle will be apparent from an examination of FIGURES 2–5 of the drawings. Thus, as will be seen from the reference numerals I, II, III, IV, the working chamber communicating with the inlet port 23 is of successively increasing volume as the rotors 10, 11 rotate in the direction of the arrows 8. A "suction stroke" is thus provided in which air is sucked through the inlet port 23.

The air which has been so sucked through the inlet port 23 is first subjected to a low pressure compression stage, indicated by the reference numerals V–VIII, and is thereafter subjected to a high pressure compression stage, indicated by the reference numerals IX–XI. During the low pressure compression stage, some of the air being compressed is within the cavity 15 whilst some of it is within the cavity 14. At the end of the low pressure compression stage, all the air being compressed is within the cavity 14. It will therefore be appreciated that the air received by the cavity 14 has been pre-compressed in passing through the cavity 15.

Figure 4:
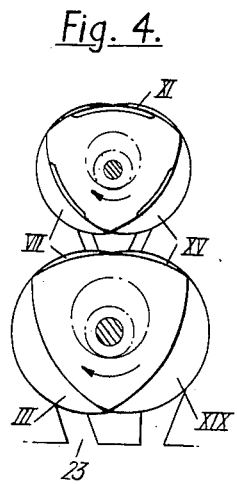
Figure 5:
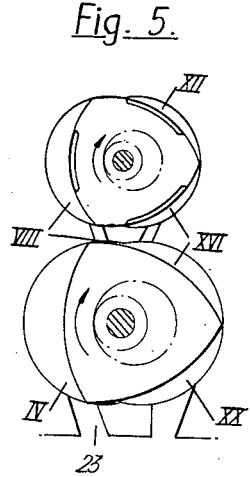

Combustion takes place when the air has been compressed to the volume indicated by the reference numeral XI (see FIGURE 4).

Thereafter expansion proceeds in two stages, a high pressure stage indicated by the reference numerals XII–XIV, and a low pressure stage indicated by the reference numerals XV–XVIII. It will be noted that the high pressure expansion stage, indicated by the reference numerals XII–XIV, occurs substantially wholly within the cavity 14, whilst the low pressure expansion stage indicated, by the reference numerals XV–XVIII, occurs partly or wholly within the cavity 15. Thus, it will be appreciated that, after the exhaust gases have been expanded within the cavity 14, they are expanded yet further within the cavity 15.

The "exhaust stroke" is represented by the decreasing volume indicated by the reference numerals XIX–XXI.

In the embodiment shown in FIGURES 6–8 rotors 10d, 11d are employed which are generally similar to the rotors 10, 11 and are mounted on eccentrics 36, 37 respectively which are themselves mounted on a common shaft 35. Both rotors 10d, 11d therefore rotate, in cavities 14d, 15d respectively, in the same direction and at the same speed and only appear to have opposite directions of rotation in FIGURES 7 and 8 respectively because they are seen in these views from opposite sides.

An inlet port 23d and exhaust port 24d are provided which are disposed on the same side of the cavity 14 as the fuel injectors 27, 28 and the spark plugs 31, 32.

A transfer duct 25d connects the cavities 14d, 15d via ports 25e, 25f in the peripheral walls of the cavities 14d, 15d whereas a transfer duct 26d connects the cavities 14d, 15d via ports 38, 39 in the side walls of the cavities 14d, 15d.

Alternatively, of course, the transfer ducts 26d could communicate with ports in the peripheral walls of the cavities 14d, 15d or again the transfer duct 25d could communicate with ports in the side walls of the cavities 14d, 15d. Equally, of course, each of the transfer ducts 25d, 26d could communicate at one end with a port in a side wall and with a port in a peripheral wall of the respective cavity.

The position and size of the ports 25e, 25f, 38 and 39 and of the transfer ducts 25d, 26d as well as the relative angular positions of the rotors 10d, 11d may be determined experimentally on an engine to give optimum performance under any desired conditions.

In the embodiment shown in FIGURE 9, the engine comprises a rotor 10e which is generally similar to the rotor 10 of FIGURE 1, and which is mounted on a shaft 12e. The engine of FIGURE 9 also comprises a rotor 40 which is mounted in a cavity 41, the rotor 40 being of the same construction as the rotor 11 of FIGURE 1. The initial compression and final expansion stages of the engine of FIGURE 9 are thus undertaken in the working chambers formed between the rotor 40 and the cavity 41.

It will be noted that the rotor 40 may, as shown, be smaller than the rotor 10e (although the rotor 40 can be made in any size to obtain the required pre-compression and final expansion ratios) and accordingly it is arranged that the rotor 40 has a greater angular velocity than the rotor 10e. This may, for example, be achieved by a train of gears, not shown. The gear ratio of the said train of gears may be chosen in conjunction with the swept volume of the rotor 40 to give a desired precompression to the charge.

The cavities 41, 14 are interconnected by transfer ducts 25g, 26g which respectively incorporate chambers 43, 44. Air which has been pre-compressed by the rotor 40 passes into the chamber 43 via a non-return valve 42. The gases which have passed to the chamber 44, after having been expanded in the cavity 14, pass to the cavity 41 by way of a valve 45.

The valve 45 may be timed to open and close in synchronism with rotation of a shaft 49 on which the rotor 40 is mounted, so that when the valve 45 is open a given volume of gas is admitted to the cavity 41 and when the valve 45 is closed, the same volume of gas is further expanded in the working chamber formed between the rotor 40 and the cavity 41 before it is exhausted to atmosphere via a port 47.

Sealing of the working chambers of the engines shown in the embodiments of FIGURES 6–8 and of FIGURE 9 may be the same as that of FIGURE 1.

The engine of the present invention could incorporate a plurality of the rotors 10 (or 10d, or 10e) and a corresponding plurality of the rotors 11 (or 11d or 40) in the same way as a reciprocating engine may be provided with a plurality of cylinders. Alternatively, in such a case, a single rotor 11 may provide for the precompression of the air and final expansion of the exhaust gases of a plurality of the rotors 10.

In the engine shown in FIGURE 10, a rotor 10f is mounted within a cavity 14f, these parts corresponding to the similarly numbered parts in FRIGURE 1. Precompression of the air supplied to the cavity 14f is effected in a compressor 51 which may be of any known kind and which may be driven, by means not shown, from a shaft 12f on which the rotor 10f is mounted. The exhaust gases leaving the cavity 14f are further expanded in a machine 52 which may be a turbine or any other known form of machine which will take either pressure energy or heat energy or both from the gas and convert it to mechanical energy. The mechanical energy so obtained in the machine 52 may be transmitted to the shaft 12f or may be used for any other desired purpose.

Air which has been pre-compressed in the compressor 51 passes through a transfer duct 25h to the cavity 14f, while exhaust gases which have been expanded in the cavity 14f pass through a transfer duct 26h to the machine 52 where they are further expanded.

Two-position rotary valves 55, 56 respectively control flow through the transfer ducts 25h, 26h. The valves 55, 56 may be set in the position shown, in which the compressor 51 and machine 52 communicate with the cavity 14f, and another position (not shown) in which the cavity 14f communicates with an inlet port 53 and an exhaust port 54.

As is well known, it is difficult to burn petrol in engines designed to ignite the charge by means of "compression ignition." If, however, an electric spark is employed to ignite the charge in such an engine, it may be desirable to lower the volumetric compression ratio of the engine. This can be done quite readily in the construction of FIGURE 10, merely by placing the valves 55, 56 in the said other position. Air (at atmospheric pressure) entering the cavity 14f will then by-pass the compressor 51, while the exhaust gases will by-pass the machine 52.

If desired, the compressor 51, or machine 52 may be mechanically disconnected from the shaft 12f by means not shown.

The valves 55, 56 need not be of the two position rotary type shown in FIGURE 10, but may be of any design which will permit by-passing of the compressor 51 and of the machine 52. Moreover, the valves 55, 56 may be inserted in the transfer ducts of any of the embodiments of FIGURES 1–9.

The rotors 11; 11d may, if desired, be replaced by employing reciprocating pistons in cylinders.

It has hitherto proved difficult, in the case of a rotary internal combustion engine of the type described, to achieve an adequate compression ratio without reducing the clearance volume to such an extent that, by virtue of its inherent geometric shape, it becomes unsuitable for efficient combustion. A high compression ratio is, however, desirable, both because it improves the thermal efficiency of the engine, and therefore results in a more economical use of the fuel, and because it permits the use of fuels having widely different ignition temperatures.

In the engines shown in the drawings, however, a high compression ratio may be achieved without producing a clearance volume which is unsuitable for efficient combustion.

A further disadvantage of the known rotary internal combustion engines of the type described has been the difficulty in making an effective seal between the working chambers thereof. This difficulty has arisen because of the shapes of the rotor and rotor housing which have prevented the use of numbers of sealing elements. In the case of the engine shown in the drawings, however, since the air supplied to the working chambers will be pre-compressed, and since further expansion of the exhaust gases will occur after the latter have left the working chambers, the differences in pressure between adjoining working chambers will be reduced, so that leakage between them will be correspondingly reduced.

I claim:

1. A rotary internal combustion engine comprising first and second outer bodies, first and second inner bodies respectively mounted within said first and second outer bodies, the second outer and inner bodies being respectively substantially larger than the first outer and inner bodies, means for effecting rotation of said inner bodies within said outer bodies and substantially in phase with each other, the said inner and outer bodies being respectively provided with surfaces which respectively define first and second working chambers, means for supplying air successively to each of the second working chambers and for successively permitting the escape of exhaust gases therefrom, ducting for supplying air which has been compressed in the second working chambers to the first working chambers for further compression therein, and for supplying exhaust gases which have been expanded in the first working chambers to the second working chambers for further expansion therein, and means for supplying fuel successively to each of the first working chambers, the first and second working chambers varying in volume and position during the rotation of the said inner bodies so that a working cycle is effected, communication between any two first and second working chambers starting when one said chamber is substantially at its maximum volume and the other said chamber is simultaneously substantially at its minimum volume and ceasing substantially when the said one chamber has reached its minimum volume and the said other chamber is simultaneously substantially at its maximum volume.

2. A rotatary internal combustion engine comprising first and second outer bodies, first and second inner bodies respectively mounted within said first and second outer bodies, the second outer and inner bodies being respectively substantially larger than the first outer and inner bodies, means for effecting rotation of said inner bodies within said outer bodies and substantially in phase with each other, the said inner and outer bodies being respectively provided with surfaces which respectively define first and second working chambers, the number of working chambers exceeding the number of first working chambers by at least one in at least some positions of the second inner body, means for supplying air successively to each of the second working chambers and for successively permitting the escape of exhaust gases therefrom, ducting for supplying air which has been compressed in the second working chambers to the first working chambers for further compression therein, and for supplying exhaust gases which have been expanded in the first working chambers to the second working chambers for further expansion therein, and means for supplying fuel successively to each of the first working chambers, the first and second working chambers varying in volume and position during the rotation of the said inner bodies so that a working cycle is effected, communication between any two first and second working chambers starting when one said chamber is substantially at its maximum volume and the other said chamber is simultaneously substantially at its minimum volume and ceasing substantially when the said one chamber has reached its minimum volume and the said other chamber is simultaneously substantially at its maximum volume.

3. A rotary internal combustion engine comprising first and second outer bodies, first and second inner bodies respectively mounted within said first and second outer bodies, the second outer and inner bodies being respectively substantially larger than the first outer and inner bodies, means for effecting rotation of said inner bodies within said outer bodies and substantially in phase with each other, the said inner and outer bodies being respectively provided with surfaces which respectively define first and second working chambers, there being three first working chambers, and there being four second working chambers in certain predetermined positions of the second inner body, means for supplying air successively to each of the second working chambers and for successively permitting the escape of exhaust gases therefrom, ducting for supplying air which has been compressed in the second working chambers to the first working chambers for further compression therein, and for supplying exhaust gases which have been expanded in the first working chambers to the second working chambers for further expansion therein, and means for supplying fuel successively to each of the first working chambers, the first and second working chambers varying in volume and position during the rotation of the said inner bodies, so that a working cycle is effected, communication between any two first and second working chambers starting when one said chamber is substantially at its maximum volume and the other said chamber is simultaneously substantially at its minimum volume and ceasing substantially when the said one chamber has reached its minimum volume and the said other chamber is simultaneously substantially at its maximum volume.

4. A rotary internal combustion engine comprising first and second outer bodies, first and second inner bodies respectively mounted within said first and second outer bodies, means for effecting relative rotation of said first inner and outer bodies and for effecting relative rotation of said inner and outer bodies, the first inner and outer bodies having surfaces defining first working chambers, and the second inner and outer bodies having surfaces, defining second working chambers, ducts successively interconnecting pairs of one of said first and one of said second working chambers, means for supplying air successively to each of the second working chambers, means for supplying fuel successively to one of the first working chambers, and means for successively permitting the escape of exhaust gases from each of the second working chambers, each of the first and each of the second working chambers varying in volume and position during the said relative rotation to effect a working cycle in which the air, after being pre-compressed in one of the second working chambers, passes via a said duct to one of the first working chambers in which it is further compressed and in which fuel is added to it, the resulting exhaust gases being thereafter expanded in one of the said first working chambers and then pasing via a said duct to another of the second working chambers in which it is further expanded, and valve means in said ducts which are settable to two positions only in one of which positions the valve means is fully opened to bring the first and second working chambers into communication with each other and in the other of which positions the valve means disconnects the first and second working chambers from each other thereby placing the first working chambers in communication with the atmosphere and thus by-passing the said second working chambers.

5. A rotary internal combustion engine comprising first and second outer bodies, first and second inner bodies respectively mounted within said first and second outer bodies, means for effecting relative rotation of said first inner and outer bodies and for effecting relative rotation at a greater rotational speed of said second inner and outer bodies, the first inner and outer bodies having surfaces defining first working chambers, and the second inner and outer bodies having surfaces defining second working chambers, first and second ducts successively interconnecting pairs of one of said first and one of said second working chambers, a non-return valve in said first duct, a timed valve in said second duct which is timed to open and close in synchronism with the relative rotational speed of said second inner and outer bodies, means for supplying air successively to each of the second working chambers, means for supplying fuel successively to each of the first working chambers, and means for successively permitting the escape of exhaust gases from another of the second working chambers, the first and second working chambers varying in volume and position during the said relative rotation to effect a working cycle in which the air, after being pre-compressed in one of the second working chambers passes via said first duct to one of the first working chambers in which it is further compressed and in which fuel is added to it, the resulting exhaust gases being thereafter expanded in one of the said first working chambers and then passing via said second duct to another of the second working chambers in which they are further expanded.

6. An engine as claimed in claim 5 in which the second inner and outer bodies are smaller than the first inner and outer bodies.

References Cited by the Examiner
UNITED STATES PATENTS

| | | | |
|---|---|---|---|
| 2,993,482 | 7/1961 | Froede | 123—8 |
| 3,049,865 | 8/1962 | Drayer | 60—13 |
| 3,139,722 | 7/1964 | Yokoi | 60—15 |

MARK NEWMAN, *Primary Examiner.*

EDGAR W. GEOGHEGAN, SAMUEL LEVINE,
*Examiners.*

A. S. ROSEN, *Assistant Examiner.*